(12) United States Patent
Woerner et al.

(10) Patent No.: US 6,481,865 B2
(45) Date of Patent: *Nov. 19, 2002

(54) HEADLIGHT DEVICE FOR VEHICLE FOR PRODUCING LIGHT BUNDLE WITH DIFFERENT CHARACTERISTICS

(75) Inventors: Bernhard Woerner, Reutlingen; Michael Hamm, Pfullingen; Henning Hogrefe, Walddorfhaeslach; Doris Boebel, Stuttgart, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/468,571

(22) Filed: Dec. 21, 1999

(65) Prior Publication Data
US 2002/0067618 A1 Jun. 6, 2002

(30) Foreign Application Priority Data
Dec. 28, 1998 (DE) .......................... 198 60 461

(51) Int. Cl.⁷ ................................ B60Q 1/24
(52) U.S. Cl. ................ 362/41; 362/464; 362/523; 362/544

(58) Field of Search ............................ 362/511, 512, 362/513, 523, 517, 525, 543, 544, 545, 41, 464, 466, 539, 507, 549

(56) References Cited

U.S. PATENT DOCUMENTS

| | | | | |
|---|---|---|---|---|
| 5,499,168 A | * | 3/1996 | Cochard et al. | 362/71 |
| 5,567,032 A | * | 10/1996 | Heizmann | 362/276 |
| 5,899,559 A | * | 5/1999 | Lechmayer et al. | 362/513 |
| 5,975,730 A | * | 11/1999 | Neumann et al. | 362/517 |
| 6,161,950 A | * | 12/2000 | Tsukamoto et al. | 362/513 |

FOREIGN PATENT DOCUMENTS

DE   43 13 914 A1   11/1994

* cited by examiner

Primary Examiner—Sandra O'Shea
Assistant Examiner—John Anthony Ward
(74) Attorney, Agent, or Firm—Michael J. Striker

(57) ABSTRACT

A headlight device for a vehicle for producing light bundles with difference characteristics has at least one headlight having a plurality of headlight units, light means including a plurality of light sources with at least one light source provided for each of the headlight units, each of the light sources produces a light bundle with at least one characteristic, the headlight units being simultaneously operatable in various combinations, at least one of the headlight units being formed so that it produces a light bundle with at least two different characteristics.

13 Claims, 5 Drawing Sheets

HEADLIGHT DEVICE FOR VEHICLE FOR PRODUCING LIGHT BUNDLE WITH DIFFERENT CHARACTERISTICS

BACKGROUND OF THE INVENTION

The present invention relates to a headlight device for a vehicle for producing light bundles having different characteristics.

One of such headlight devices is disclosed for example in the German patent document DE 43 13 914 A1. This headlight device has several headlight units which produce correspondingly each light bundle with a predetermined characteristic. The headlight units are simultaneously operable in various combinations. For each characteristic of the light bundle, a separate headlight unit is provided, through which a light bundle with only one characteristic is produced. This requires a great manufacturing expense for the headlight device and moreover a great space consumption for accommodation of all headlight units.

SUMMARY OF THE INVENTION

Accordingly, it is an object of present invention to provide a headlight device for vehicles of the above mentioned general type, which avoids the disadvantages of the prior art.

In keeping with these objects and with others which will become apparent hereinafter, one feature of present invention resides, briefly stated in a headlight device, in which at least one of the headlight units is formed so that light bundles with at least two different characteristics can be produced by the at least one headlight unit.

The headlight device in accordance with the present invention has the advantage that the number of the headlight units which is required for producing the light bundles with different characteristics can be reduced, and as a result the manufacturing expenses and the space consumption are reduced as well.

In accordance with anotherfeature of present invention at least one headlight unit is formed so that it produces alternatingly a light bundle with a low beam characteristic or a light bundle with a high beam characteristic. Thus, only one headlight unit is required.

In accordance with still a further feature of present invention, at least one headlight unit has a screen device with which it is possible to change illumination of the close region in front of the vehicle by the light bundle produced by the headlight unit, so that the illumination intensity in the close region can be weakened by the screen device. With this construction, it is possible to avoid a blinding of the opposite traffic in the event of wet streets.

In accordance with still a further feature of the present invention, the headlight unit is formed so that the course of the light bundle is produced by it is changeable in a horizontal direction. Thereby the direction of the light bundle emitted by the headlight unit can be adjusted to the course of the roadway or corresponding operational conditions of the vehicle.

In a still further embodiment of the present invention, at least one headlight unit is formed so that it produces a concentrated light bundle for illumination a distant region in front of the vehicle. Thereby an increased illumination of the distant region in front of the vehicle is possible.

In accordance with a further embodiment of the invention, the headlight unit is formed so that the course of the light bundle produced by it can be changeable in a horizontal and/or vertical direction. This allows adaptation of the direction of the light bundle so that with low beam light the distant region under the bright-dark limit and with high beam light the distant region above the dark-bright limit is provided.

Still another feature of the present invention is that at least one headlight unit is formed so that it produces a light bundle oriented at one side, with which a substantially lateral region in front of the vehicle is illuminated. This embodiment makes possible an improved illumination, in particular over a curve travel.

Still another feature of present invention is that the headlight unit produces a light bundle oriented at one side, with which a lateral region is illuminated, which extends outwardly beyond the light bundle produced by the headlight unit with the low beam characteristic, or the characteristic for high beam with the illuminated region having a course which is changed in the horizontal direction. In this construction, with a small number of headlight units, it is possible to improve the illumination during driving over curves with a small curve radius and with a great curve radius.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
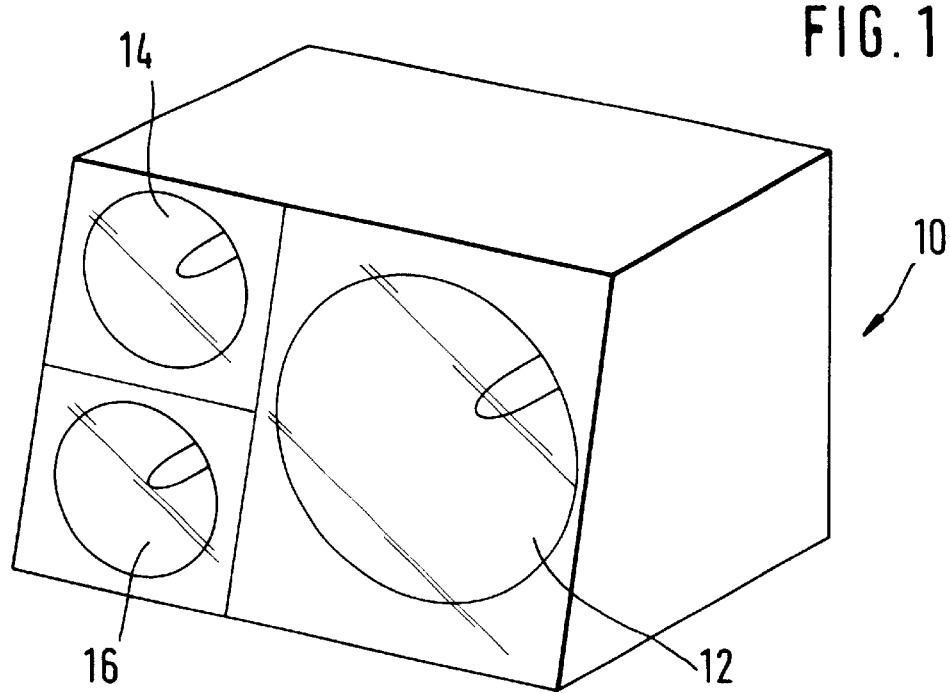
FIG. 1 is a simplified front view of a headlight device in accordance with the present invention.

An inventive headlight device for a vehicle, in particular a motor vehicle operates for producing light bundles with different characteristics. The headlight device has at least two headlights 10 arranged in a known manner at the front end of the vehicle. FIG. 1 shows only one headlight as an example.

The headlight 10 has several headlight units 12, 14, 16 which produce the light bundles with different characteristics. The characteristics of the light bundle include their course in horizontal and/or vertical direction, their bright-dark limit, their range width, and illumination intensity distribution to be produced by them. In order to maintain a low number of the headlight units 12, 14, 16 at least one of the headlight units 12, 14, 16 is formed so that by its light bundle at least two different characteristics can be produced.

The headlight 10 has a headlight unit 12 which is formed so that selectively at least one light unit with a low beam characteristic, for example a low beam light, and at least one light bundle with a high beam characteristic can be produced.

Figure 7:
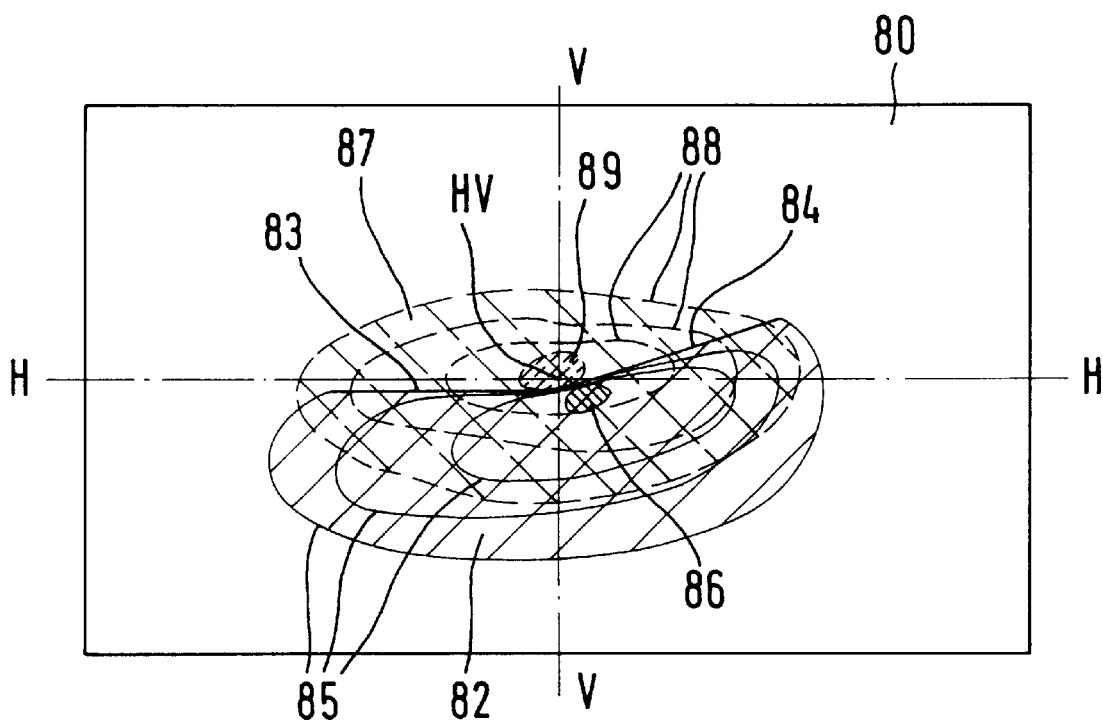
FIG. 7 is a view showing a measuring screen arranged in front of the headlight for illumination by a light bundle emitted by the headlight unit in accordance with a first and second embodiment.

FIG. 7 shows a measuring screen 80 which is arranged at a distance in front of the headlight 10, which is illuminated by the light bundle produced by the headlight 12. The horizontal central plane of the measuring screen 8 is identified with HH and its vertical central plane is identified with VV. The horizontal central plane HH and the vertical central plane VV intersect in a point HV. The light bundle produced by the headlight 12 with characteristic for low beam illuminates a region 82 of the measuring screen 80. The headlight unit 12 is designed for a right traffic, whereby the region 82 is limited from above by an asymmetrical bright-dark limit. The bright-dark limit at the counter traffic side, which is the left side of the measuring screen 80 has a horizontal portion 83 which extends substantially 1% under the horizontal central plane HH. At the traffic side itself, which is the right side of the measuring screen 80, the bright-dark limit has a portion 84 which starts from the horizontal portion 83 and has an inclination angle of approximately 15° relative to the horizontal central plane HH. The distribution of the illumination intensity in the region 82 is represented by several lines with the same illumination intensity or so-called isolux lines 85. In the region 82, in the zone 86 closely under the bright-dark limit and substantially right of the vertical central plane 8, the highest illumination intensity is provided.

The light bundle produced by the headlight unit 12 with a characteristic for high beam illuminations a region 87 of the measuring screen 80. In the region 87 furthermore several isolux lines 88 are identified. In a zone 88 around the point HV the highest illumination intensity is available. The region 87 has no pronounced bright-dark limit.

Figure 2:
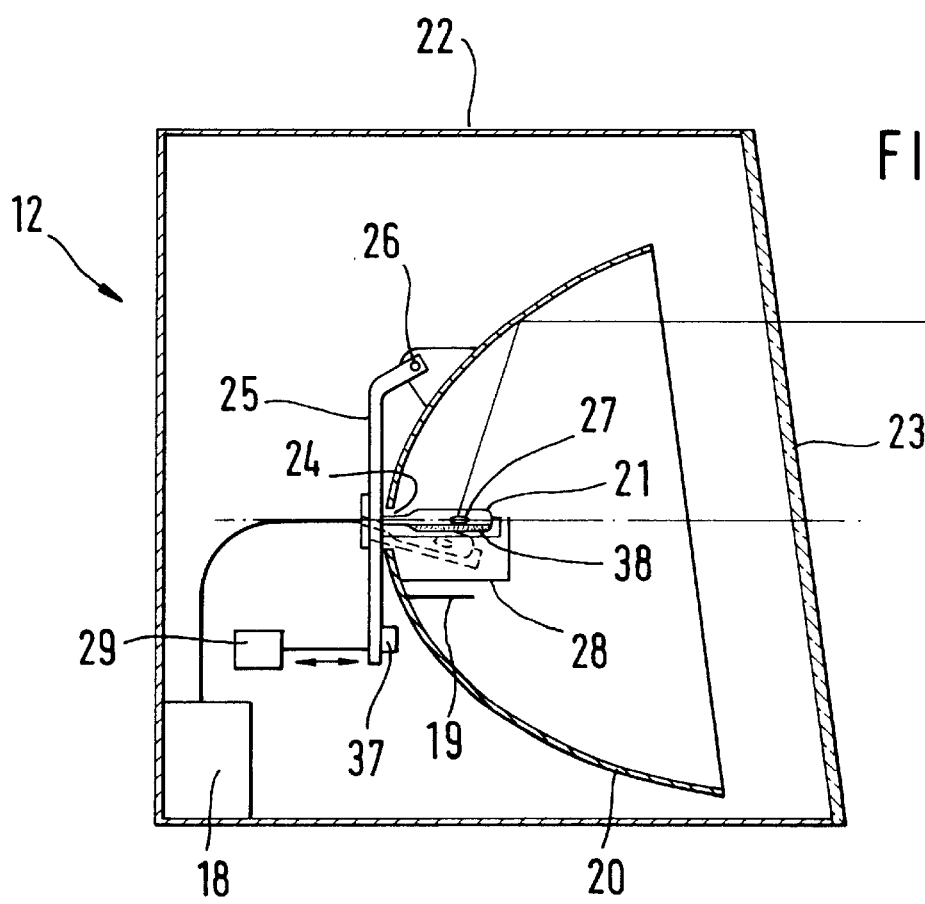
FIG. 2 is a view showing a headlight unit of the headlight of FIG. 1 in accordance with a first embodiment of the present invention.

FIG. 2 shows the headlight unit 12 in accordance with a first embodiment of the present invention. The headlight unit 12 is formed in accordance with a reflection principle and has a reflector 20 and a light source 21, which can be an incandescent lamp or preferably a gas-discharge lamp. The reflector 20 with the light source 21 is arranged displaceably in a holder or a housing 22. The light outlet opening of the housing 22 is covered by a light-permeable disk 23, which can be formed as a smooth disk or can be provided with optical profiles for deviation and/or dispersion of the passing light. The reflector 20 can be composed of metal or synthetic plastic, and has an opening 24 provided in its apex region for the light source 21. The light source 21 is held in a lamp carrier 25 which is supported turnably at least directly on the reflector 20 around an axis 26 extending substantially horizontally. The turning axis 26 extends near the upper edge of the lamp carrier 25. The light source 21 extends with its glass bulb, in which during operation a light arc 27 is formed, through the opening 24 of the reflector 20, so that the light emitted by the light arc 27 is reflected by the concavely curved reflection surface of the reflector 20. A screen device 28 can be associated with a light source 21. It screens a part of the light emitted by the light source 21 so that it does not fall on the reflector 20. The screening device 28 produces the bright-dark limit of the light emitted by the headlight unit 12 with the characteristic of the low beam light.

An adjusting device 29 engages the lamp carrier 25 eccentrically to the turning axis 26. It is used for turning the lamp carrier 25 with the light source 21 about the axis 26. The adjusting device 29 can be formed for example as an electric motor, which displaces the rod engaging on the lamp carrier 25 via a transmission. The electric motor can be formed for example as a stepper motor. The adjusting device 29 can alternatively be formed for example as an electric motor, through which the rod engaging the lamp carrier 25 can be displaced. Furthermore, alternatively it is also possible to form the adjusting device 29 as a hydraulic or pneumatic drive for displacement of the rod which engages the lamp carrier 25.

With the adjusting device 29, the lamp carrier 25 with the light source 21 held in it, is movable between one end position for low beam light and one or several positions for high beam light. In FIG. 2 the lamp carrier 25 and the light source 21 are shown in solid lines in their end position for low beam light. The lamp carrier 25 can be located in abutment against an abutment 37, to provide the exact arrangement of the light source 21 relative to the reflector 20, as required for the low beam light. The lamp carrier 25 is located in its turned position relative to the reflector 20 which is the farthest opposite to the clockwise direction. The light source 21 is arranged relative to the reflector 20 so that the light emitted by the light arc 27 is reflected by the reflector 20 as a light bundle inclined downwardly. It illuminates the region 82 of the measuring screen 80 with the bright-dark limit 83, 84 and the shown illumination intensity distribution. The bright-dark limit 83, 84 can be produced by the screening device 28 and/or by a light-impermeable coating 38 of the glass bulb of the light source 21 and/or by a corresponding shape of the reflector 20, by which the light emitted by the light source 21 is reflected so that it has the bright-dark limit 83, 84.

FIG. 2 shows the lamp carrier 25 and the light source 21 in broken lines in their end position for high beam light, in which the lamp carrier 28 is located in its turned position located the farthest in clockwise direction. The light source 21 in its position for the high beam light is moved opposite to its end position for the low beam light toward the apex of the reflector 10 downwardly. The lamp carrier 25 can be located in the end position for the high beam light also in abutment against a stop. In addition the screen device 28 can be spaced completely or partially from the path of beam of the light emitted by the light source 21 in its end position for the high beam light. By the change arrangement of the light source 21 reflector to the reflector 20, the light emitted by the light source 21 can be reflected by the reflector 20 with a different characteristic than with the arrangement of the light source 21 in its end position for low beam light.

The light bundle produced by the headlight unit 12 with the light source 21 in its end position for high beam light illuminates the measuring screen 80 of FIG. 7 in a region 87 identified with broken lines. In the region 87 several isolux lines 88 are shown for illustration of the distribution of the illumination intensity. In a zone 89 around the point HV, the highest illumination intensity is provided which is higher than in the zone 86 of the region 82. The region 87, which is illuminated by the light bundle with the characteristic of high beam light is displaced upwardly relative to the region 82 which is illuminated by the light bundle with the characteristic for low beam light. It has a pronounced bright-dark limit and the highest maximum of the illumination intensity.

It can be also provided that the lamp carrier 25 with the light source 21 is turnable into one or several intermediate position between the end position of the low beam light and the end position for the high beam light.

The characteristic of the light bundle produced by the headlight 12 can be changed so that starting from the end position for the low beam light toward the end position of the high beam light the characteristic changes from the characteristic for the low beam light to the characteristic to the high beam light so that the region illuminated by the light bundle on the measuring screen 80 is displaced upwardly, the bright-dark limit is less pronounced, and the maximum of the illumination intensity is higher. The turning of the lamp carrier 25 with the light source 21 can be performed for example in dependence from the speed of the vehicle. With increasing speed, the lamp carrier 25 with the light source 21 can be turned further toward the end position for the high beam light. This can be preformed for example during travel on a roadway without an opposite traffic, which can cause a blinding.

Figure 3:
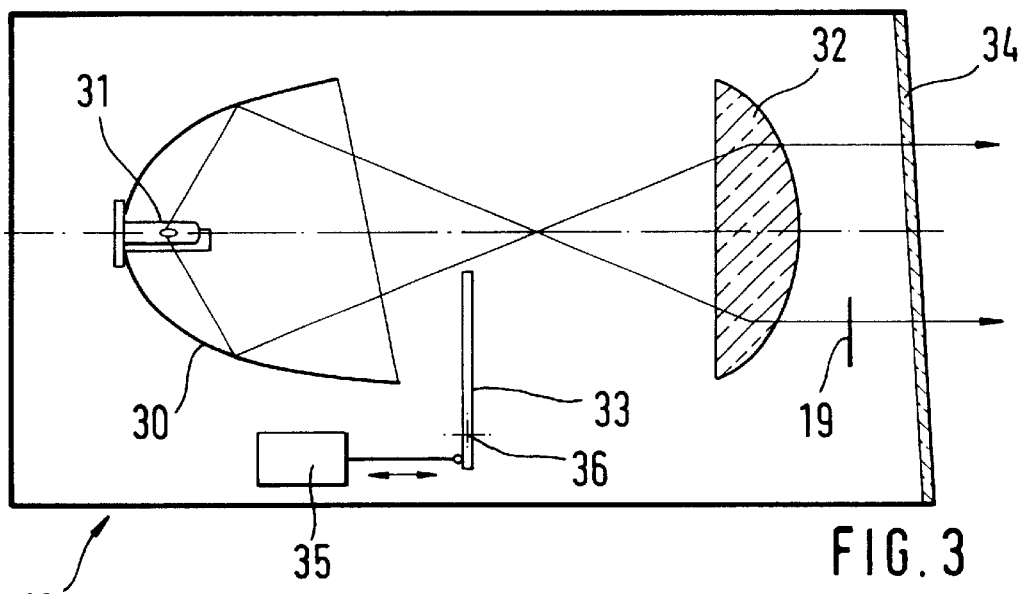
FIG. 3 is a view showing a headlight unit of the headlight of FIG. 1 in accordance with a second embodiment of present invention.

The headlight unit 12 shown in FIG. 3 in accordance with a second embodiment is formed in accordance with the projection principle. The headlight unit 12 has a reflector 30 in which a light source 31 in form of an incandescent lamp or a gas discharge lamp is inserted. A lens 32 is arranged in the light outlet direction after the reflector 30 and a screen 33 is arranged between the reflector 30 and the lens 32. After the lens 32 in the light outlet direction, a light-permeable disk 34 is arranged, which can be formed as a smooth disk or can be provided with optical profiles. The light emitted by the light source 31 is reflected as a converging light bundle.

The screen 33 can be formed light-impermeable. It is movable between a position in which it extends in the beam path of the light bundle reflected by the reflector 30, and a position in which it does not extend or extends less far into the path of beam of the light bundle reflected by the reflector 30. The screen 32 can be turnable for example by an adjusting element 35 around an axle 36. Alternatively, the screen 33 can be arranged stationarily, and can have a changeable light permeability. The screen 33 is switchable between a condition with a high light permeability and a condition with a low light permeability. In the operation of the headlight 12 for the low beam light the screen 33 extends in the path of beam of the light bundle reflected by the reflector 30 or located in the condition of lower light permeability. With the screen 30 a part of the light bundle reflected by the reflector 30 is screened, and the light bundle passing on the screen 33 and through the lens 32 has a bright-like limit. With the light bundle produced by the headlight unit 12 with the characteristic of the low beam light, the region 82 of the measuring screen 80 of FIG. 7 is illuminated.

In the operational condition for the high beam light, the screen 33 is turned out at least partially from the path of beam of the light bundle reflected by the reflector 30 or located in its condition with high light permeability, so that a greater part of the light bundle reflected by the reflector 30 passes through the lens 32 and can exit from the headlight unit 12. With the light bundle produced by the headlight unit 12 with the characteristic of the high beam light, the region 27 of the measuring screen 80 of FIG. 7 is illuminated. Instead, a screen 33 can be provided by two or more screens arranged near one another in the light outlet direction, and movable together or independently from one another or changeable with respect to their light permeability. The screen 33 can be movable in several stages or continuously so that starting from its position for low beam light in which it extends the farthest in the radiation direction, it arranged increasingly to its position for high beam light, and extends further far in the path of beam. Thereby the bright-dark limit produced by the screen 33 lies increasingly higher. Also, the light permeability of the screen 33 can be changeable in steps or continuously between the condition with low light permeability for producing the low beam light and the condition of high light permeability for producing the high beam light, so that the position of the bright-dark limit and/or the produced illumination intensity can be changed.

With the use of gas discharge lamp as the light source 21 or 31 for the headlight unit 12, an electrical pre-switching device 18 is needed for its operation. It serves for ignition of the gas discharge lamp 21 and after ignition guarantees a stable operation of the gas discharge lamp 21. It can be provided that the electrical power with which the gas discharge lamp 21 is operated with the pre-switching device 18 can be changeable, so that the light current emitted by the gas discharge lamp 21 can be changed. For example, for a basic illumination, the gas discharge lamp is operated with relatively low power, for example approximately 32 watt, for a highway illumination with a higher power for example substantially 35 watt, and for a speed way illumination or for high beam with a further increased power for example substantially 38 watt.

The headlight unit 12 in accordance with the first or second embodiment moreover can have a screen device 19, by which a part of the produced light bundle can be screened at least partially, by which lower zones of the region 89 are illuminated. The lower zones of the region 82 correspond to the close region in front of the vehicle. The screening device 19 can be formed for example as a light-impermeable screen which is movable between a position in which it extends in a path of beam of the light bundle reflected by the reflector 20 or 30 or it extends in the path of beam between the light source 21, 31 and the reflector 20, 30 and a position in which it is arranged outside of the path of beam. Alternatively the screen device 19 can be arranged stationarily and can have a changeable light permeability. When the close region must be illuminated intensely, the screen device 19 is located in a condition of high light permeability, and when the close region must be illuminated weaker the screen device 19 is located in a position of lower light permeability. A weakening of the illumination of the close region is preferable for example for wet streets, for avoiding a blinding of the counter traffic. The condition of the street can be detected by a sensor device, and the weakening of the illumination of the close region can be performed automatically.

Figure 4:
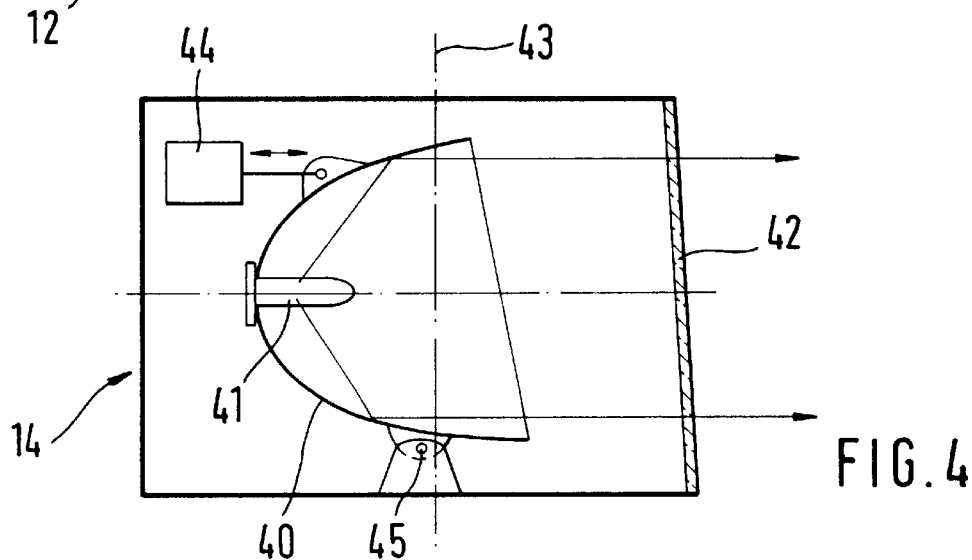
FIG. 4 is a view showing the headlight unit of the headlight of FIG. 1 in accordance with a third embodiment of present invention.

FIG. 4 shows an embodiment of the headlight unit 14, which serves for producing a concentrated light bundle. The headlight unit 14 is formed for example in accordance with the reflection principel and has a reflector 40, and a light source 41 which can be formed as an incandescent lamp or a gas discharge lamp. The light opening of the headlight unit 14 is covered with a light-permeable disk 42, which can be formed as a smooth disk or can be provided with optical profiles, by which the passing light can be dispersed and/or deviated. The reflector 40 is preferably turnable around at least one vertically extending axis 43 by an adjusting element 44. The possible turning angle of the reflector 40 around the axis 43 can amount to substantially 5°–10°. Additionally, the reflector 40 is turnable about a substantially horizontally extending axis 45. The possible turning angle of the reflector 40 around the axis 45 can amount to substantially 10°–2°.

Figure 8:
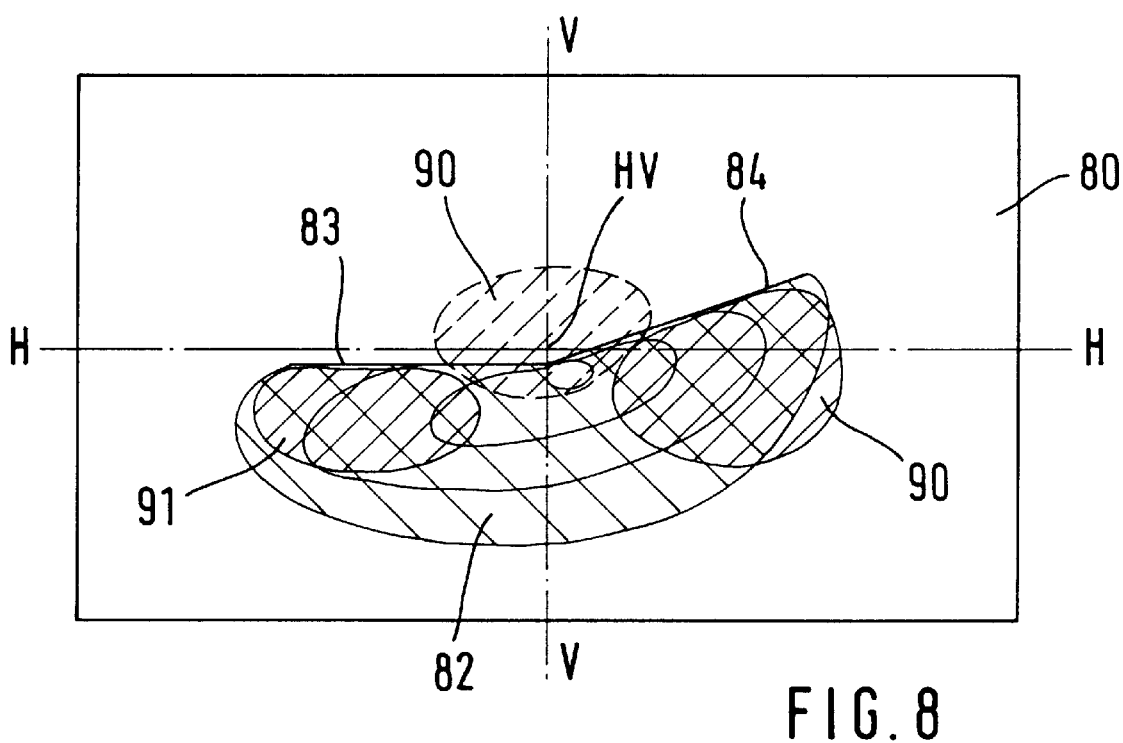
FIG. 8 is a view showing the measuring screen during illumination by a light bundle emitted by the headlight unit in accordance with the third embodiment of the present invention.

FIG. 8 shows the measuring screen 80 illuminated by a light bundle produced by the headlight unit 14. The light bundle which is produced by the headlight unit 14 with the reflector 40 in a first position illuminates a region 90 on the measuring screen 80, which is arranged at the right side of the vertical central plane VV of the measuring screen 80 under the portion 84 of the bright-dark limit of the region 82 and adjoining the same. The region 90 has a lower extension than the region 82, and in particular has a lower extension in a vertical direction than the region 82. The light bundle produced by the headlight unit 14 does not illuminate or illuminates only weakly the close region of the roadway in front of the vehicle. The light bundle produced by the headlight unit 14 amplifies in a spot-like manner the illumination of the far region on the traffic side. By turning of the reflector 40 around the vertical axis 43 the region illuminated by the light bundle produced by the headlight unit 14 is displaced in the horizontal direction, and the region 90 is displaced in a vertical direction by turning of the reflector 40 around the horizontal axis 45. For example, in the operational condition of the headlight device for low beam light, with the light bundle produced by the headlight unit 14 the illumination of the far region above the bright-dark limit 83, 84 is amplified by the light bundle produced by the headlight unit 12 with the characteristic of the region 82 for low beam light.

In the operational condition of the headlight device for high beam the light bundle produced by the headlight unit bundle of the headlight unit 14 lifts the illuminated region and displaces to the center of the measuring screen 80 as shown in the broken lines in FIG. 8, in order to amplify the illumination of the far region additionally to the light beam produced by the headlight unit 12 with the characteristic for high beam light. It can be provided that with the right and with the left headlight 10 of the vehicle, the front light bundles can be produced by the corresponding headlight unit 14. For example, the light bundle produced by the headlight unit 14 of the left headlight can illuminate the region 90 under the portion 84 of the bright-dark limit, while the light bundle produced by the headlight unit 14 from the right headlight illuminates a region 91 at the left side of the measuring screen 80 under the portion 83 of the bright-dark limit. In the headlight unit 14 of the headlight of both sides of the vehicle, an adjusting possibility of the reflector 40 can be provided, or it can be provided only in the headlight unit 14 of the headlight at one side. The circuit connection of the headlight unit 14 to the headlight unit 12 can be performed for example automatically at high speed of the vehicle, during traveling over a highway or a speedway. When the circuit connection of the headlight unit 14 is performed in the operational position of the headlight device for low beam light, the light bundle produced by the headlight unit 14 must provide an illumination under the bright-dark limit. A circuit connection of the headlight unit 14 can be performed moreover automatically for wet streets or counter traffic which can be detected by sensor devices, in order to improve the visibility conditions in the high beam region. Moreover, the headlight unit 14 can be used for day travel illumination without the operation of the headlight unit 12.

The headlight unit 14 can be formed as the headlight unit 12 of the first and second embodiment and can have a movable light source 31 in correspondence with FIG. 2, or a screen which is movable or has a changeable light permeability of FIG. 3. The light bundle emitted by the headlight unit 14 can be therefore changed so that the illumination in the far region under the light-dark limit is provided, in a case of the support of the low beam light, or in far region above the bright-dark limit and in the case of the support of the high beam. The reflector 30 of the headlight unit 14 and the reflector 20 of the headlight unit 12 can be coupled with one another or can be arranged on a common carrier element, in order to guarantee the same arrangement of the bright-dark limit of the light bundles emitted by the both headlight units 12 and 14.

Figure 5:
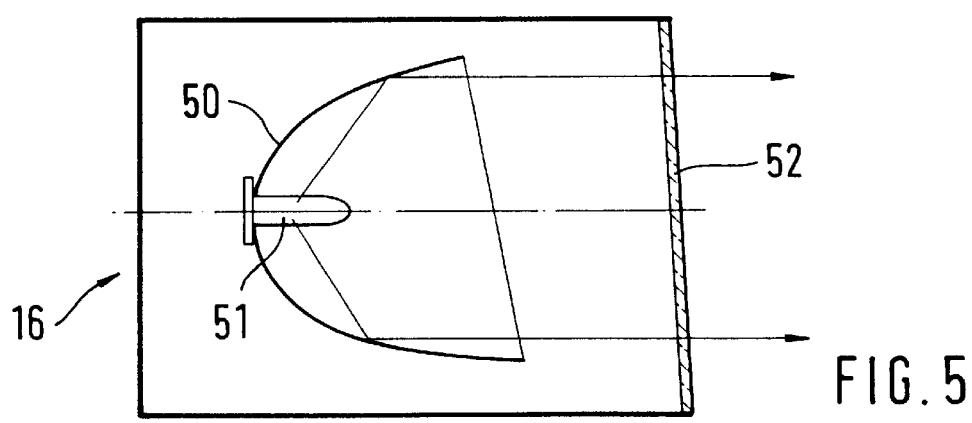
FIG. 5 is a view showing a headlight unit of the headlight of FIG. 1 in accordance with a fourth embodiment of the present invention.
Figure 9:
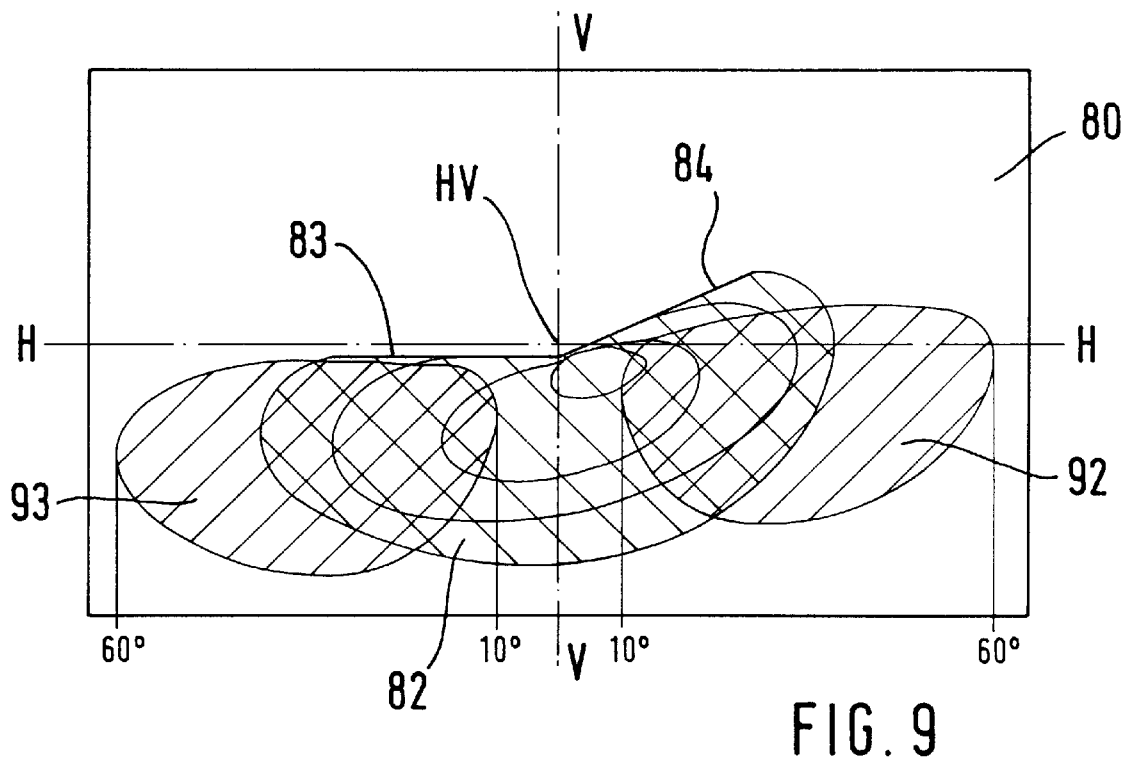
FIG. 9 is a view showing a measuring screen during illumination by a light bundle emitted by the headlight unit in accordance with a fourth embodiment of present invention.

FIG. 5 shows an embodiment of the headlight 16, which serves for producing a light bundle oriented at one side, for illumination of a lateral region in front of the vehicle. The headlight unit 16 is formed for example in accordance with the reflection principle and has a reflector 50 and a light source 51 which can be an incandescent lamp or a gas discharge lamp. The light outlet opening of the headlight unit 16 is covered with a lightpermeable disk 52, which can be formed as a smooth disk or can be provided with optical profiles for dispersing and/or deflecting of the passing light. FIG. 9 shows a measuring screen 80 which is illuminated by a light bundle produced by the headlight unit 16. The light bundle illuminates a region 92 or 93 which is arranged under the bright-dark limit 83, 84 of the region 82. The region 92 is arranged at the right side of the vertical central plane VV of the measuring screen 80 and the region 93 is arranged in the left side of the vertical central plane VV. It can be provided that the right region 92 is illuminated by a light bundle produced by the headlight unit 16 of the left headlight of the vehicle, and the left region 93 is illuminated by the light beam produced by the headlight unit 16 of the right headlight of the vehicle. Alternatively, the arrangement of the regions 92, 93 can be opposite, so that the right region 92 is illuminated by the light beam produced by the headlight 16 on the right headlight of the vehicle, and the left region 93 is illuminated by the light beam produced by the headlight unit 16 of the left headlight of the vehicle.

The regions 92, 93 extend in a horizontal direction for example approximately 100–600 to the right or to the left of the vertical central plane VV. In the vertical direction the regions 92, 93 have substantially the same extension as the region 82 which is illuminated by the light bundle produced by the headlight unit 12 with the characteristic for low beam light. The headlight unit 16 is provided for improving the illumination in front of the vehicle during traveling over a curve. When the vehicle drives over a right curve, the headlight 16 is turned on, with which the right region 92 is illuminated, and when the vehicle travels over a left curve, the headlight unit 16 is turned on, with which the left region 93 is illuminated. The detection of the course of the roadway can be performed by one or several sensor devices, for example by a sensor device which detects a steering angle or by a video sensor device which detects the ambiance in front of the vehicle. Moreover, the course of the roadway in front of the vehicle can be determined by a navigation system which processes the information about the street network and the actual position of the vehicle. A turning on of the headlight unit 16 can be performed also by actuation of traveling direction indicator of the vehicle to achieve an improved illumination in the curved direction.

The headlight unit 16 can be subdivided into two or several headlight subunits, with which the light bundles with differently strong lateral orientation are produced. For example, the headlight unit 16 can have a headlight subunit for producing a light bundle which illuminates a region of substantially 10–40° of horizontal extension near the vertical central plane W and a central headlight subunit which produces a light bundle for illumination of a region of substantially 30–60° of a horizontal extension near the vertical central plane VV. Depending on a curve radius, the suitable headlight subunit of the headlight unit 16 can be turned on. With a greater curve radius the headlight subunit is turned on, which illuminates the region of substantially 10°–40°0 and with smaller curve radius the headlight subunit is turned on which illuminates the region of substantially 30°–60°, or both headlight subunits are turned on.

A circuit connection of the headlight unit 16 to the headlight unit 12 can be performed for example automatically at low speed, which is for example the case in the city traffic, for improving the lateral illumination of the vehicle. For this purpose the headlight unit 16 of both headlights of the vehicle are turned on. A turning on of the headlight unit 16 can be performed further in the case of wet streets during raining, during snowfall or during fog, which can be performed automatically with the use of a suitable sensor device for detection of these conditions. Moreover, a turning on of the headlight 16 can be also performed in the case of a counter traffic, for improving the lateral illumination in front of the vehicle and thereby facilitating the orientation of the vehicle steering.

Figure 6:
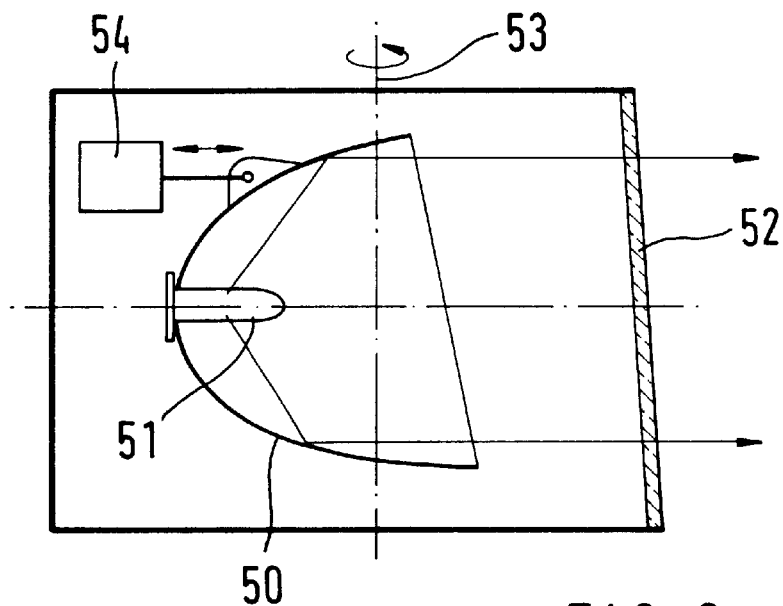
FIG. 6 is a view showing a headlight unit of the headlight of FIG. 1 in accordance with a third embodiment of the present invention.
Figure 10:
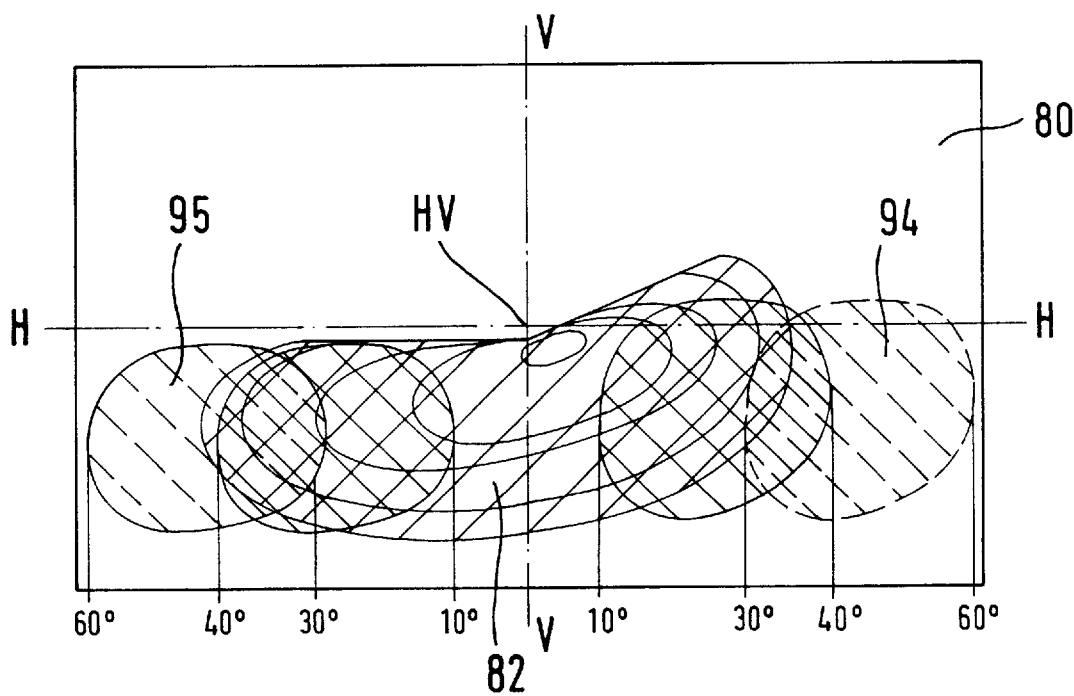
FIG. 10 is a view showing a measuring screen during illumination by a headlight emitted by the headlight unit in accordance with a fifth embodiment of the present invention.

FIG. 6 shows a modified embodiment of the headlight unit 16 in which the reflector 50 is turnable about a substantially vertically extending axis 53 by an adjusting element 54. The light bundle produced by the headlight unit 16 illuminates a region 94 or 95 of the measuring screen 80 in FIG. 10, which has a horizontal extension over substantially 30–50°. By turning of the reflector 50 of the headlight unit 16, the region 94 or 95 can be arranged with minimal turning of the reflector 50 so that it extends from substantially 100 to substantially 40–60° near the vertical central plane, while the region 94 or 95 extends with maximum turning of the reflector 50 from substantially 30° to substantially 60–80° near the vertical plane VV. The turning of the reflector 50 is performed in dependence on the curve radius of the driving curve, while the reflector 50 is turned more the smaller is the curve radius. A turning on of the headlight unit 16 in accordance with this embodiment can be performed also with an actuated travel direction indicator of the vehicle.

In accordance with a further embodiment of the headlight device it is provided that the headlight unit 12 is formed so that the headlight unit or at least its reflector 20 of the first embodiment or the structural group composed of the reflector 30, the lense 32 and the screen 32 is turnable about the substantially vertically extending axis, analogously to the headlight unit 16 of FIG. 6. In addition, a headlight unit 16 is formed so that it produces a light bundle which illuminates the measuring screen 80 only at one side of the vertical central plane VV. Thereby by turning, the region 82 illuminated by the light bundle produced by the headlight unit 12 can be displaced in the horizontal direction by a predetermined distance to the left and to the right. The turning angle of the headlight unit 12 can be limited, for example to substantially 5–20°, while the turning provides an improved illumination in front of the vehicle during driving over a right or left curve with reflectively great curve radius. With the light bundle produced by the headlight unit 16, a region is illuminated which extends in a horizontal direction of substantially 20–60° near the vertical central plane VV. The headlight unit 16 during turning over a curve with a small radius is circuit-connected to the headlight unit 12. Turning-on of the headlight unit 16 can be also performed when the travel direction indicator in the vehicle is actuated, for reaching an improved illumination in a curved direction.

Figure 11:
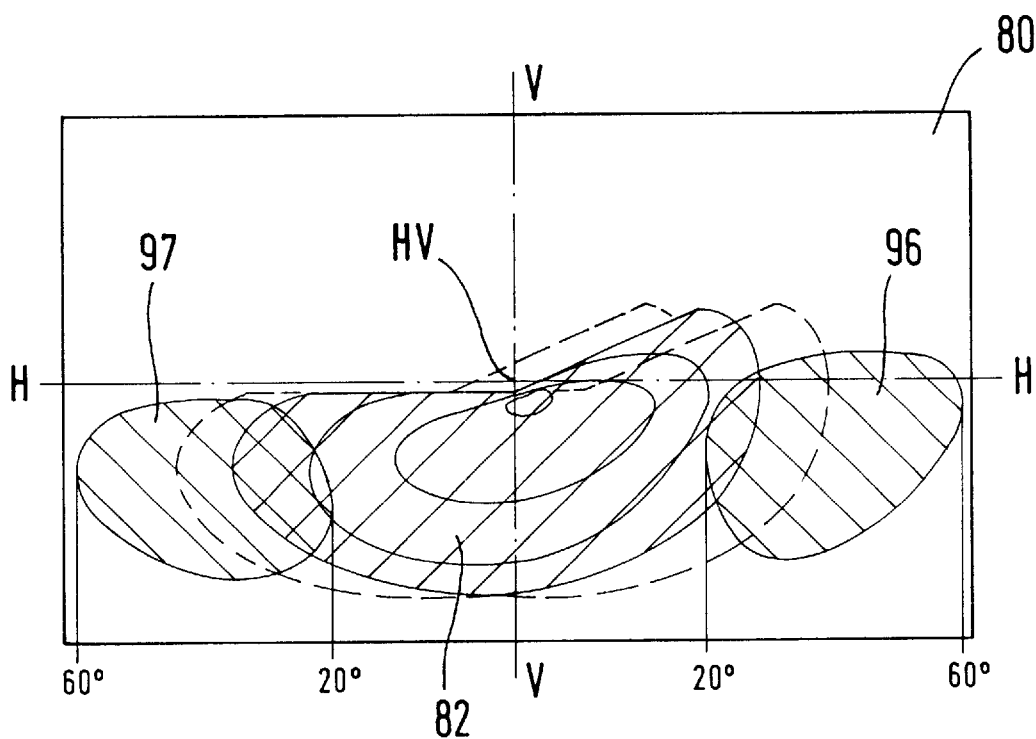
FIG. 11 is a view showing a measuring screen during illumination by a light bundle produced by the headlight device in accordance with a further embodiment.

The light bundle produced by the headlight unit 16 illuminates a lateral region which extends outwardly over the region illuminated by the light bundle produced by the headlight unit 12. FIG. 11 shows a measuring screen 80, with a region 82 which is illuminated by a light bundle produced by the headlight unit 12 in its not turned position. Broken lines illustrate the region 82 with the headlight unit 12 turned to the right and to the left. With the light bundle produced by the headlight unit 16 of the right or left headlight, the region 96 right of the vertical central plane VV is illuminated, which extends to the right outside of the region 82, which is illuminated by the light bundle produced by it with the headlight unit 12 turned to the right. The light bundle produced by the headlight unit 16 of the other headlight illuminates the region 97 at the left of the vertical central plane VV which extends to the left outwardly beyond the region 82 illuminated by the light bundle which is produced by the headlight unit 12 turned to the left.

It will be understood that each of the elements described above, or two or more together, may also find a useful application in other types of constructions differing from the types described above.

While the invention has been illustrated and described as embodied in a headlight device for vehicle for producing light bundle with different characteristics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight device for a vehicle for producing light bundles with difference characteristics, comprising at least one headlight having a plurality of headlight units; light means including a plurality of light sources with at least one light source provided for each of said headlight units, each of said light sources produces a light bundle with a least one characteristic, said headlight units being simultaneously operatable in various combinations, at least one of said headlight units being formed so that it produces a light bundle with at least two different characteristics, said at least one headlight unit being formed so that it produces alternatingly a light bundle with a low beam characteristic and a light bundle with a high beam characteristic, said at least one headlight unit being also formed so that a course of the light bundle produced by at least one headlight unit is changeable in a horizontal direction to adjust the light bundle emitted by said at least one headlight unit to the course of a roadway, said at least one headlight unit comprising means for detecting the course of the roadway and an adjusting element for turning said at least one headlight unit about a substantially vertically extending axis.

2. A headlight device as defined in claim 1, wherein said at least one light unit has a reflect or and a light source which is movable relative to said reflector at least between a position for producing the light beam with the low beam characteristic and a position for producing the light beam with the high beam characteristic.

3. A headlight device as defined in claim 2, wherein said light source is also movable to at least one intermediate position between said position for producing the light beam with the low beam characteristic and the position of producing the light beam with the high beam characteristic.

4. A headlight device as defined in claim 1, wherein said at least one headlight unit has a reflector, a light source, a lens arranged after said reflector in a light outlet direction and a screen device arranged between said reflector and said lens. Said screen device being changeable so that for producing the light beam with low beam characteristic it screens a part of light reflected by said reflector and produces a dark-limit of the light bundle, and for producing the light bundle with high beam characteristic it lets light reflected by said reflector at least substantially out of said one headlight unit.

5. A headlight device as defined in claim 4, wherein said screen device is adjustable in at least one intermediate condition between its condition for producing the light bundle with the low beam characteristic and its condition for producing the light bundle with high beam characteristic.

6. A headlight device as defined in claim 1, wherein at least one headlight unit has a screen device for changing illumination of a close region in front of the vehicle by a light bundle produced by said at least one headlight unit, so that an illumination intensity in the claws region is weakened by said screen device.

7. A headlight device as defined in claim 1, wherein another headlight unit is formed so that it produces a concentrated light bundle which illuminates substantially a far region in front of the vehicle.

8. A headlight device as defined in claim 7, wherein the other headlight unit is formed so that a course of the light bundle produced by it is changeable in a direction selected from the group consisting of a horizontal direction, a vertical direction, and both horizontal and vertical directions.

9. A headlight device as defined in claim 1, wherein said further headlight unit is formed so that a light bundle produced by it is oriented at one side so as to illuminate a lateral region in front of the vehicle.

10. A headlight device as defined in claim 9, wherein said further headlight unit is formed so that a course of the light bundle produced by it is changeable in a horizontal direction.

11. A headlight device as defined in claim 1, wherein at least one further headlight unit produces a light bundle which is oriented at one side for illumination a lateral region which extends outwardly beyond a light bundle produced by said at least one headlight unit with the low beam characteristic or the characteristic for high beam with a course changing in a horizontal direction.

12. A headlight device as defined in claim 1, wherein said light source of at least one of said headlight units is operated with a power which is changeable.

13. A headlight device as defined in claim 1, wherein said light source of at least one of said headlight units is a gas discharge lamp.

* * * * *